United States Patent Office 2,797,680
Patented July 2, 1957

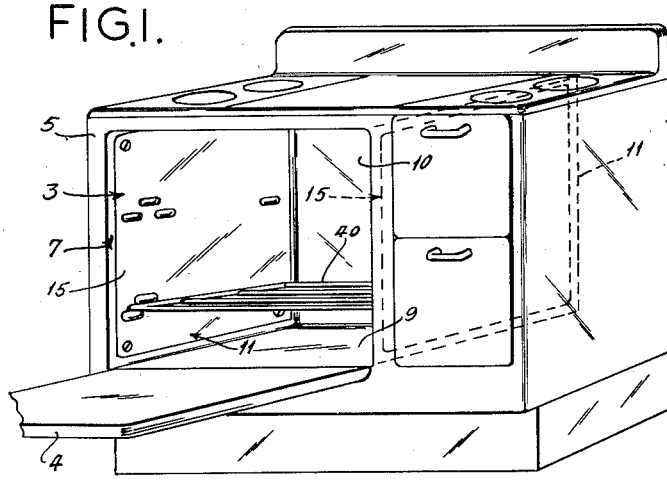

2,797,680

OVEN LINER

Eric W. Nagel, St. Louis, Mo., assignor to Wrought Iron Range Company, St. Louis, Mo., a corporation Application November 26, 1954, Serial No. 471,441

1 Claim. (Cl. 126—19)

This invention relates to the construction of inner walls of a range oven, and to oven rack guides used in conjunction therewith.

In oven liners known heretofore, the wall panels have been made integral with one another, as by being welded together. Oven guides have been welded or riveted to the liner, or the liner has been bent or drawn to provide rack guides. Some consideration has been given to permitting the liner to expand with respect to the shell of the oven to prevent actual buckling of the liner as, for example, in the United States patent to Clark, No. 2,555,841. However, no oven liner known heretofore has been sufficiently free of strain during the heating and cooling of the oven to permit the successful use of a cover coat of enamel on the rack guide-carrying side walls. Either the problem has not been clearly grasped, or, if it has been recognized, no one heretofore has solved the problem of providing oven liner side walls which are free to expand not only with respect to the oven shell but with other parts of the oven liner itself, and which carry oven rack guides in such a way as to be free of strain.

The fact that severe strains are set up in the oven liner side walls known heretofore when the liner is alternately heated and cooled has made it necessary either to make the side walls of uncoated metal, or to use a dark, usually black or dark blue cobalt oxide, coating. A ground coat of such material will bond sufficiently well to the metal to withstand the stresses and strains placed upon it, but a cover coat of enamel will simply not stand up under these strains. The strains from the rack guides known heretofore result not only from the welding of the rack guides to the liner but from the unequal expansion, during the thermal changes of the oven, of the guides and of the side walls to which the rack guides are rigidly secured.

One of the objects of this invention is to provide an oven liner which is provided with separate side wall panels so mounted as to be free to expand and contract with respect to the shell of the oven and with respect to the remaining elements of the oven liner.

Another object of this invention is to provide such side wall panels with oven rack guides mounted on but unsecured to them and so constructed and arranged as to exert no strain on the side wall panels by virtue of thermal changes in the oven.

Still another object of this invention is to provide both side wall panels and oven guides which are simple to manufacture, dependable, easily replaced, and particularly attractive in appearance.

In accordance with this invention generally stated, an oven liner is provided which includes separate side wall panels each of which is mounted within the oven shell independently in such a way as to be free to expand and contract with respect to the shell of the oven and to the rest of the oven liner. Each of the side panels is provided with holes in which hat-shaped rack guides are inserted with their crowns projecting into the interior of the oven.

The panels are preferably given a cover coat of bright colored enamel.

In the drawing,

Figure 1 is a view in perspective of a range, the oven of which is provided with a liner constructed in accordance with one embodiment of this invention;

Figure 2 is a fragmentary sectional view of an oven showing a side panel of this invention in side elevation;

Figure 3 is a sectional view taken along the line 3—3 of Figure 2;

Figure 4 is a top plan view partly broken away of a rack guide constructed in accordance with one embodiment of this invention; and Figure 5 is a view in perspective of the rack guide shown in Figure 4.

Referring now to the drawing, reference numeral 1 indicates a range having an oven 3, with a door 4. The oven proper is made up of an outer shell 5 and a liner 7. The space between the outer shell 5 and the liner 7 is filled with insulating material 6.

The liner 7 has a top 8, a bottom 9, a back wall 10, and two side walls 11. The top, bottom, back and side walls of the liner may be coated with the usual dark colored ground coat and may be connected in any of the usual ways.

Each of the side walls 11 is provided with four internally threaded bosses 12.

Mounted along and on the opposite side walls 11 are side wall panels 15 which are mirror images of one another. In the embodiment shown, each of the side wall panels 15 takes the form of a flat rectangular plate with a bead 16, turned toward the side wall 11, and extending all the way around the perimeter of the panel, defining the boundaries of the panel.

Near each of the corners of the panel 15 is a bolt hole 18. The bolt holes 18 coincide with the threaded bosses 12. The panel 15 is mounted on the side wall 11 by means of bolts 20 having large heads 22 and threaded shanks 24 which extend through the bolt holes 18 and take into the bosses 12. The holes 18 are large with respect to the shanks 24.

In the embodiment shown, each of the side panels 15 is provided with two sets of rack guide holes, an upper set 26 and lower set 28, spaced vertically so as to provide two levels at which racks may be positioned.

In each of the sets 26 and 28 of rack guide holes, there is an upper oven rack guide hole 30 positioned relatively near the door 4 of the oven; a forward lower oven guide hole 32, positioned horizontally closer to the door 4 than the upper guide hole 30; an intermediate lower oven rack guide hole 34 extending horizontally in a direction toward the back of the oven from the upper hole 30; and a rearward lower oven guide hole 36, positioned relatively close to the back of the oven. The lower oven rack guides 32, 34 and 36 are horizontally aligned and are spaced vertically below the upper oven rack guide hole 30 a distance slightly greater than the height of an oven rack 40 as shown somewhat exaggeratedly in Figure 3.

Oven rack guides 50 are mounted in each of the oven rack guide holes 30, 32, 34 and 36. The oven rack guides 50 are hat-shaped, with a crown 52 and a brim 54. They are preferably hollow, as shown in Figure 4. The crown has substantially flat sides 56 and rounded ends 58. The sides 56 and the ends 58 may be slightly tapered convergently from the brim toward the top of the crown to permit more ready drawing of the die with which they are formed.

In installing the side panels 15 it is only necessary to insert the oven rack guides 50 in the holes 30, 32, 34 and 36 crown side first from the back of the panel until the brims 54 engage the back of the panel around the holes, place the panel in position with the large holes 18 over the threaded bosses 12, and screw the shanks 24 of the bolts 20 into the bosses 12 until the heads 22 of the bolts bear upon the inside face of the panel snugly but not so tightly as to prevent relative movement of the panel and liner side wall in response to thermal changes.

The holes 18 are sufficiently large with respect to the shanks 24 to ensure that, at any temperature from cold room temperature to the highest oven operating temperature, the wall panels 15 will not bind against the shanks.

There is also enough clearance between the edge of each of the oven rack guide holes 30, 32, 34, and 36 and the crown of its respective oven rack guide 50 to ensure that the oven rack guides do not exert any expansive force against the edges of the holes. The rack guides are prevented from falling out behind the panel by the side walls 11.

The function of the oven rack guide in the upper oven rack guide hole 30 is to prevent upward displacement of the rack 40.

In actual practice, the oven rack guides 50 are chrome plated to give them an attractive appearance and long wearing properties. The side wall panels 15 are given a cover coat of bright colored enamel such as red, and the contrast with the dark colored top, bottom, and back walls and the chromium oven guides is striking and pleasing in appearance.

Not only does the construction of the liner of this invention add to the appearance of the oven, but it has certain additional advantages. The panels themselves may easily be removed and replaced, for cleaning or for changing their color scheme. The oven rack guides may also easily be removed and replaced.

Numerous variations in the construction of the liner of this invention within the scope of the appended claim will occur to those skilled in the art in the light of the foregoing disclosure. For example, similar panels, without the rack guide holes, can be installed on the top, bottom, and back walls of the liner, and even on the inside face of the door. The rack guides may be given different shapes, sizes, and positions. More or fewer sets of rack guides may be provided to allow for different amounts of adjustment and different numbers of racks. While one of the advantages of the present invention is the fact that white or bright-colored enamel cover coats may be used on the panels, the panels can be left uncoated.

Thus it can be seen that an oven liner construction is provided which accomplishes a result which has hitherto been unattained, in a simple manner.

Having thus described the invention, what is claimed and desired to be secured by Letters Patent is:

In a range oven having an oven liner, said liner having oppositely disposed side walls, the improvement comprising separate side wall panels, plane within their boundaries and provided with rack guide receiving holes in a predetermined pattern and with a cover coat of enamel, means for mounting one of said side wall panels along the inner face of each of the side walls for independent movement with respect to said side walls in response to temperature changes within the oven throughout the range of temperatures to which a range oven is normally subjected, and hat-shaped rack guides having a brim and a crown, the crown of each guide projecting through a hole in one of said panels and the brim extending beyond the periphery of the hole between the lining and the panel, said guides being loosely mounted in said holes and independently of one another.

References Cited in the file of this patent
UNITED STATES PATENTS

| | | |
|---|---|---|
| 2,225,762 | Barnsteiner | Dec. 24, 1940 |
| 2,580,153 | Birkic | Dec. 24, 1951 |